US012803494B2

(12) United States Patent
Sutanto et al.

(10) Patent No.: US 12,803,494 B2
(45) Date of Patent: Nov. 17, 2026

(54) INTEGRATED METAL ROOF ATTACHMENT

(71) Applicant: Unirac, Inc., Albuquerque, NM (US)

(72) Inventors: Cornelius Keegan Sutanto, Albuquerque, NM (US); Ernest Gallegos, Albuquerque, NM (US); Robert Anthony Inge, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 7 days.

(21) Appl. No.: 18/899,358

(22) Filed: Sep. 27, 2024

(65) Prior Publication Data

US 2026/0092676 A1 Apr. 2, 2026

(51) Int. Cl.

| | |
|---|---|
| ***H02S 20/23*** | (2014.01) |
| ***F16B 2/06*** | (2006.01) |
| ***F16B 9/00*** | (2006.01) |
| ***F16M 13/02*** | (2006.01) |

(52) U.S. Cl.

CPC .............. *H02S 20/23* (2014.12); *F16B 2/065* (2013.01); *F16B 9/054* (2018.08); *F16M 13/02* (2013.01)

(58) Field of Classification Search

CPC ......... F16M 13/02; F16B 2/065; F16B 9/054; H02S 20/23

See application file for complete search history.

(56) References Cited

U.S. PATENT DOCUMENTS

| | | | | |
|---|---|---|---|---|
| 7,703,256 | B2 * | 4/2010 | Haddock | F16B 2/10 52/24 |
| 8,844,234 | B2 * | 9/2014 | Haddock | F16B 5/0096 52/545 |
| 9,011,034 | B2 * | 4/2015 | Liu | F24S 25/615 403/381 |
| 9,353,527 | B2 * | 5/2016 | Smeja | E04D 3/02 |
| 10,502,457 | B2 * | 12/2019 | Haddock | F24S 25/615 |
| 10,948,002 | B2 * | 3/2021 | Haddock | F16B 2/065 |
| 11,035,126 | B2 * | 6/2021 | Haddock | H02S 20/22 |
| 11,603,675 | B2 * | 3/2023 | Nichols | A62B 35/0068 |
| 11,742,793 | B2 * | 8/2023 | Garza | H02S 30/00 248/229.1 |
| 12,057,801 | B1 * | 8/2024 | Jasmin | H02S 20/23 |
| 12,534,916 | B2 * | 1/2026 | Moss | E04D 3/36 |
| 12,627,252 | B2 * | 5/2026 | Kobayashi | F16B 2/065 |
| 2010/0133040 | A1 * | 6/2010 | London | E04G 21/3261 182/3 |
| 2010/0171016 | A1 * | 7/2010 | Haddock | E04D 13/10 248/237 |
| 2015/0060620 | A1 * | 3/2015 | Smeja | E04D 13/10 248/237 |

(Continued)

*Primary Examiner* — Eret C McNichols

(74) *Attorney, Agent, or Firm* — Lee & Hayes, P.C.

(57) ABSTRACT

An apparatus includes a first portion. A through-hole extends in a first direction from a first side of the attachment to a second side of the attachment. The through-hole is configured to receive a first fastener. A second portion includes a first vertical wall having an indentation disposed on an inner surface. A second vertical wall has an aperture extending in a second direction perpendicular to the first direction. The aperture is configured to receive a second fastener. A channel is defined between the first vertical wall and the second vertical wall, the channel being sized to receive a standing seam.

20 Claims, 15 Drawing Sheets

(56) References Cited

U.S. PATENT DOCUMENTS

| | | | | |
|---|---|---|---|---|
| 2021/0194410 | A1 * | 6/2021 | Yang | H02S 20/23 |
| 2022/0056716 | A1 * | 2/2022 | Nichols | A62B 35/0068 |
| 2025/0297704 | A1 * | 9/2025 | Komuravelly | F16M 13/022 |

* cited by examiner

INTEGRATED METAL ROOF ATTACHMENT

BACKGROUND

The solar industry is growing worldwide and, as a result, more efficient structures are desirable for mounting photovoltaic modules or solar panel modules to a structure, such as a roof of a home or other building. While different structures are known, there is a desire to reduce their complexity during the installation of the solar panel modules. Therefore, there is a need for improved equipment to mount solar panel modules.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to embodiments of an integrated attachment designed to connect to rail for supporting solar modules to a metal roof, such as a standing seam metal roof. The system, attachment, and/or one or more components thereof may alternatively be referred to as an apparatus. Features of the system are further described as shown in the figures and expressed in the claims listing. Advantages of installation of solar panels using the disclosed embodiments may include reduction of assembly time on the roof, less components and fasteners on the roof resulting in reduced risk for dropping and losing items on the roof and reduction of the attachments'unit cost by reducing fabrication steps.

Illustrative Embodiments

Figure 1:
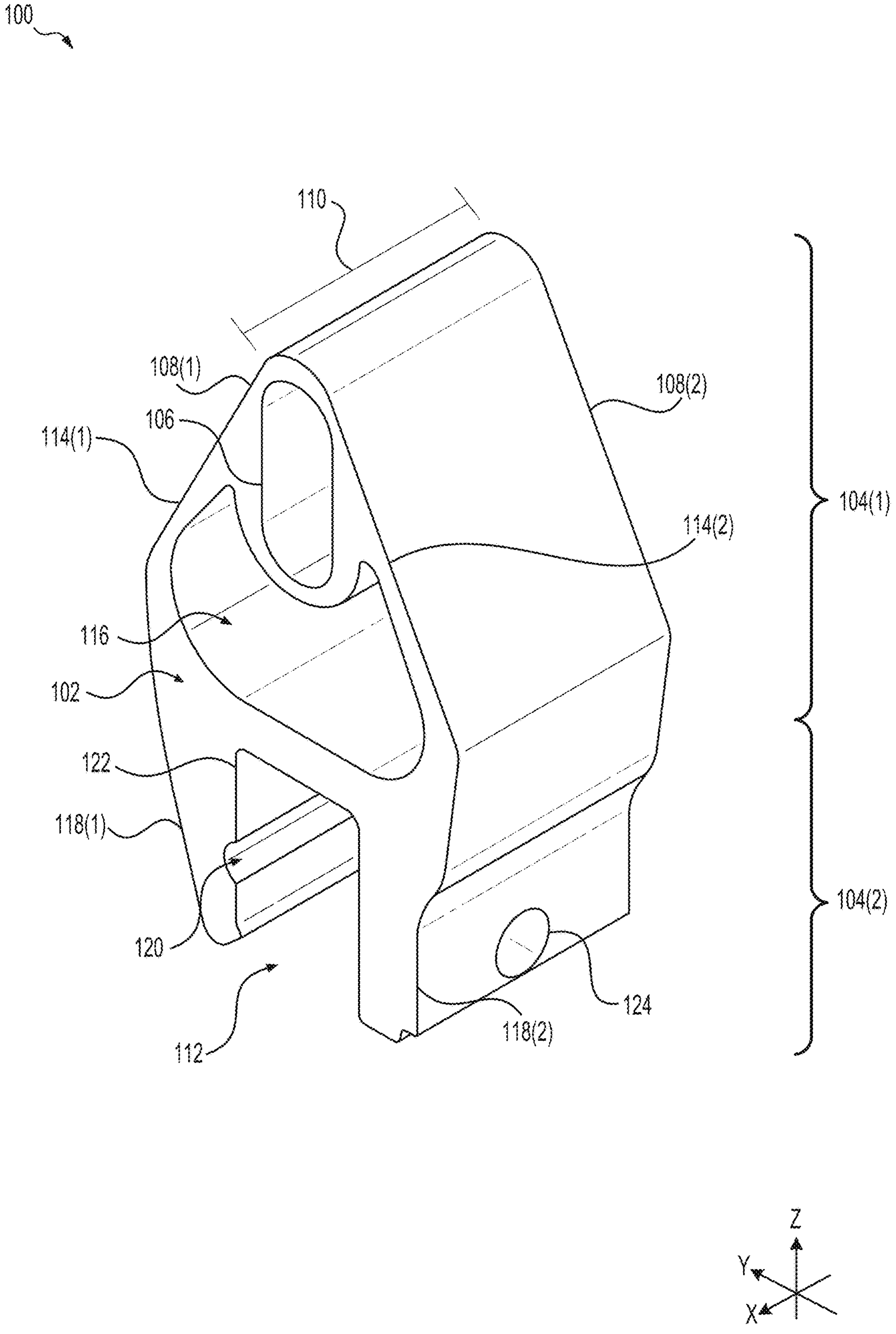
FIG. 1 illustrates an isometric view of an exemplary integrated attachment that connects a rail for supporting solar modules to a metal roof, such as a standing seam metal roof, according to an embodiment in this disclosure.

FIG. 1 illustrates an isometric view of an integrated attachment 100 for connecting a rail for supporting solar modules to a metal roof, such as a standing seam metal roof, according to an embodiment in this disclosure. The integrated attachment 100 may connect or mount to a rail and a standing seam, corrugation, or other protrusion in the metal roof (illustrated in FIG. 3).

The integrated attachment 100 may include a body 102 that may be extruded as a single piece. For example, the integrated attachment 100 may be a metal extrusion, such as an aluminum extrusion, although other suitable materials or methods of manufacture may be considered according to the desired performance and function.

The body 102 may include a top portion 104(1) and a bottom portion 104(2). The top portion 104(1) may include a through-hole 106 defined along an X-axis through the body 102 from a first side 108(1) to a second side 108(2). A thickness 110 of the body 102, measured in the X-axis direction from the first side 108(1) to the second side 108(2), may vary (the dimensions are determined prior to manufacture) depending on the desired structural integrity of the body 102 under expected loads after installation. In an embodiment, a shape of a cross-sectional (taken along a Y-Z plane) opening of the through-hole 106 may be elongated in the Z-direction, as shown. Further, the through-hole 106 may vary in size and/or shape, so long as the size/shape accommodates a fastener (not shown) therein to secure the top portion 104(1) of the body 102 to a surface of a rail. Accordingly, the fastener may be moveable or adjustable within the through-hole 106 along the Z-axis to enable the integrated attachment 100 to be positioned at various relative positions to the rail. In an embodiment, the fastener may include a T-bolt or any other suitable fastener.

The bottom portion 104(2) may include a channel 112 that extends in the direction of the thickness 110 as well. The channel 112 is open in the Z-axis direction at the edge of the bottom portion 104(2) and is closed in the Z-axis direction by a web of material of the body 102 distinguishing the bottom portion 104(2) from the top portion 104(1). As such, the channel 112 does not intersect the through-hole 106. The direction of extension of the channel 112 may be aligned (e.g., along the X-axis within the body 102) with the direction of extension of the through-hole 106. In the embodiment of FIG. 1, the through-hole 106 has a width (e.g., measured in the Y-direction) that is less than a width of the channel 112 (e.g., measured in the Y-direction), but the relative widths of the through-hole 106 and the channel 112 may be different in other embodiments.

The top portion 104(1) may further include a first sidewall 114(1) and a second sidewall 114(2) angled to intersect and form a triangular shape and enclose therebetween the through-hole 106. The nature of the triangular shape of the top portion 104(1) may provide improved strength to the integrated attachment 100. When compared to a quadrangular shape, the triangular shape utilizes less material and therefore may reduce material cost while providing more or substantially the same shape. Additionally, the top portion 104(1) may include a cavity 116 to further reduce material. The cavity 116 may extend in the X-axis direction from the first side 108(1) of the body 102 to the second side 108(2) of the body 102. Though shown as completely through the thickness 110 of the body 102, the cavity 116 may vary in size, depth, and shape and may be disposed between the through-hole 106 and the channel 112. In an embodiment, the cavity 116 may assist in wire management. As an example, a clip or other attachment (not shown) may be inserted into the cavity 116 or attached to a sidewall (e.g., first or second sidewalls 114(1)/114(2)) of the body 102 and an inner wall of the cavity 116. The use of the clip with the cavity 116 may prevent interference with the module, module clamps and roof attachments.

The bottom portion 104(2) may further include a first vertical wall 118(1) and a second vertical wall 118(2), which together define the sides of the channel 112. With the first vertical wall 118(1) and the second vertical wall 118(2) opposing each other, the channel 112 is configured to straddle a standing seam of a metal roof. In an example, the channel 112 is configured to bend in order to accommodate a folded standing seam. The first vertical wall 118(1) may include an indentation 120 (e.g., one or more distinct dimples, a continuous groove, etc.) on an inner surface 122. In another embodiment, the first vertical wall 118(1) may not include indentation 120, such that the inner surface 122 may be smooth. The second vertical wall 118(2) may include an aperture 124 that extends through the second vertical wall 118(2) and in a direction perpendicular to the channel 112. In an embodiment, the aperture 124 may be threaded and/or otherwise configured to receive a fastener for securing the bottom portion 104(2) of the body 102 against a standing seam of a metal roof. In an embodiment, the fastener may be a set screw, screw, bolt, or any other suitable type of fastener. The aperture 124 may be concentric to, or otherwise aligned to engage with, the indentation 120 to provide an improved connection between the integrated attachment 100 and a standing seam on which the integrated attachment 100 is installed. In an alternative embodiment, the bottom portion 104(2) may include multiple apertures (threaded or unthreaded) like aperture 124 to accommodate additional fasteners. Additionally, in an embodiment, the channel 112 may comprise a U-shaped channel.

Figure 2:
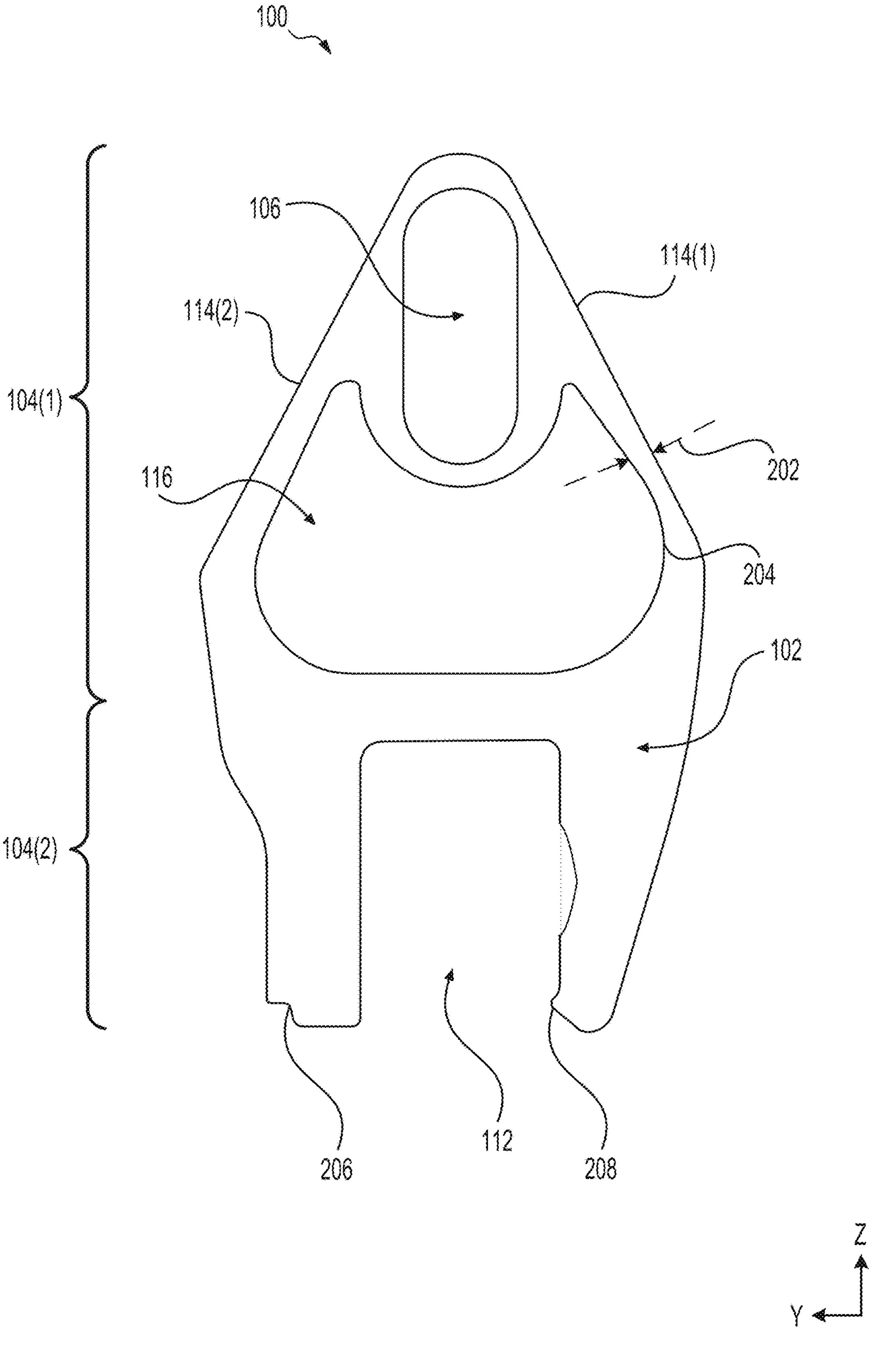
FIG. 2 illustrates a first side view of the integrated attachment of FIG. 1, according to an embodiment in this disclosure.

FIG. 2 illustrates a first side view of the integrated attachment 100, according to an embodiment in this disclosure. As depicted, the top portion 104(1) of the body 102 may include the first sidewall 114(1) and the second sidewall 114(2). In an embodiment, the top portion 104(1) may be configured to enable attachment to a solar support rail either by T-bolt or by a rail clamp.

As noted above, the top portion 104(1) may be formed in a triangular shape. With respect to the sidewall 114(2) (for example) between and the inner wall 204 of the cavity 116, a wall thickness 202 may vary. As noted above, the size of the cavity 116 is considered with the amount of material in the integrated attachment 100. By having thinner walls 114(1)/114(2) and a larger cavity 116, less material is used, thereby saving costs associated with manufacturing. In some embodiments, wall thickness 202 may be dependent upon expected loads, but wall thickness 202 may be any suitable thickness without departing from the spirit and scope of the present disclosure.

Additionally, in an embodiment, an elongated furrow 206 (i.e., rut, groove, notch, etc.) may be formed in a lower end on the outer side of the second vertical wall 118(2), which extends along a thickness direction (the X-direction) of the attachment 100. This furrow 206 may be formed to accommodate a shape of the roof seam or otherwise assist the attachment 100 in maintaining position on the seam. In an embodiment, a lip 208 may extend in the X-axis direction along an inner surface of the first vertical wall 118(1) and may provide added grip against a standing seam (not shown in FIG. 2), when installed.

Figure 3:
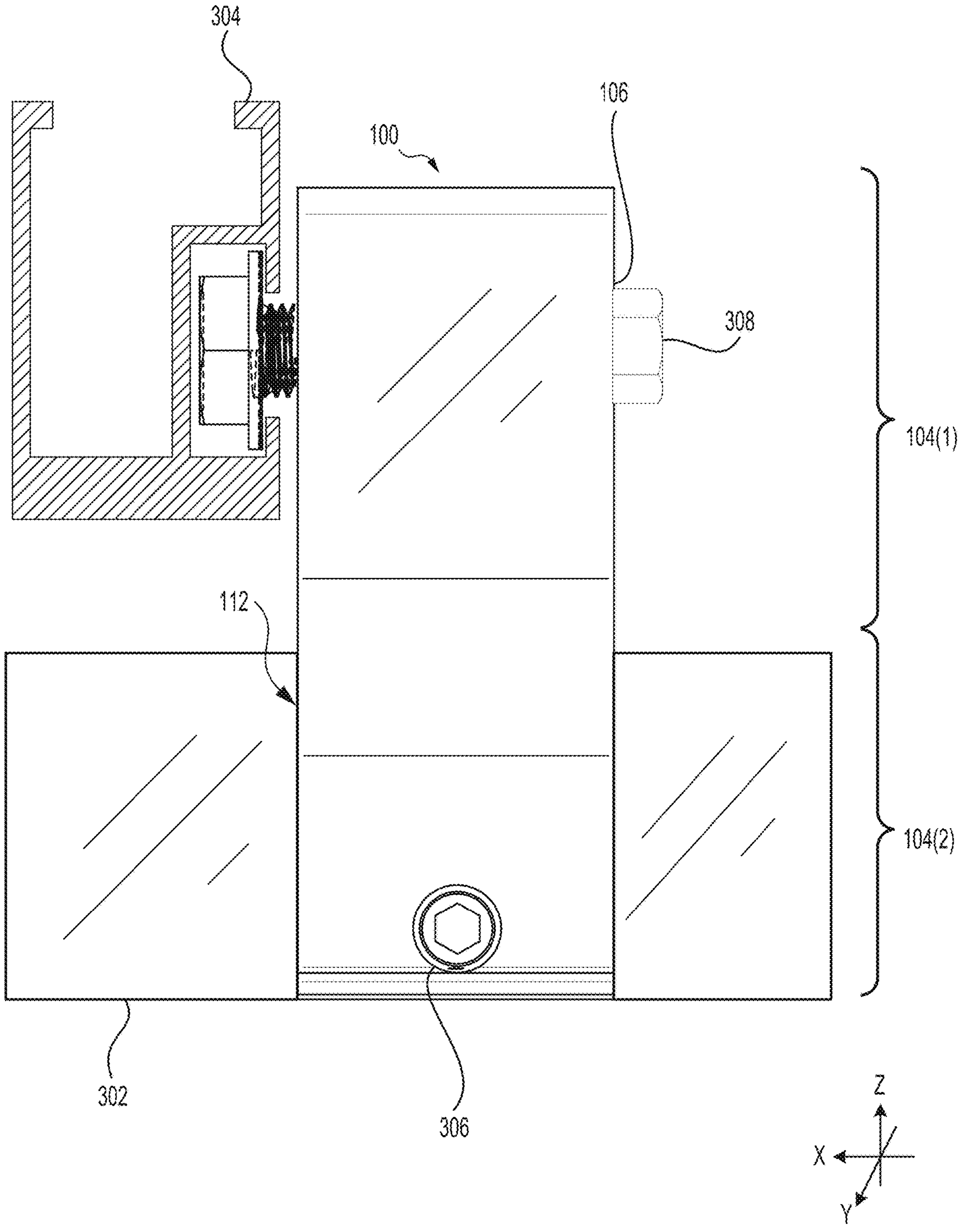
FIG. 3 illustrates a second side view of the integrated attachment of FIG. 1, according to an embodiment in this disclosure, and attachment to a standing seam and rail.

FIG. 3 illustrates a second side view of the integrated attachment 100, according to an embodiment in this disclosure. As shown, the bottom portion 104(2) of the integrated attachment 100 may be connected to a standing seam 302 by straddling the seam 302 between the first and second vertical walls 118(1)/118(2) (see FIG. 1) so the seam 302 passes through the channel 112. The standing seam 302 may be oriented such that the seam 302 extends perpendicular to a roof eve or ridge on a metal roof. Moreover, the top portion 104(1) may be connected to a rail 304 (shown in cross-section). The rail 304 may be oriented to extend in a direction (e.g., in the Y-direction) perpendicular to the direction of extension of the standing seam 302. To attach the integrated attachment 100 to the seam 302, a first fastener 306 (e.g., set screw, T-bolt, etc.) is inserted into aperture 124 and locally pushes/deflects/deforms the seam 302 to engage with the indentation 120. Alternatively, the first fastener may engage with the surface of the seam 302 in a binding manner without puncturing the seam 302.

The top portion 104(1) may be connected to the rail 304 by receiving a second fastener 308 (e.g., set screw, T-bolt, nut, etc.) in the through-hole 106. The second fastener 308 may extend perpendicular to a sidewall of the rail 304 and may be secured via a side channel in the rail (as depicted). Notably, both the rail 304 and the second fastener 308 shown are merely generic examples of rail shapes and fasteners, as those components may vary. Further, the term "rail" as used herein may refer to varying lengths or segments of rails.

While not shown, a clamp may be attached to the rail 304 to secure a solar panel to the roof via the rail 304 and the integrated attachment 100.

Figure 4:
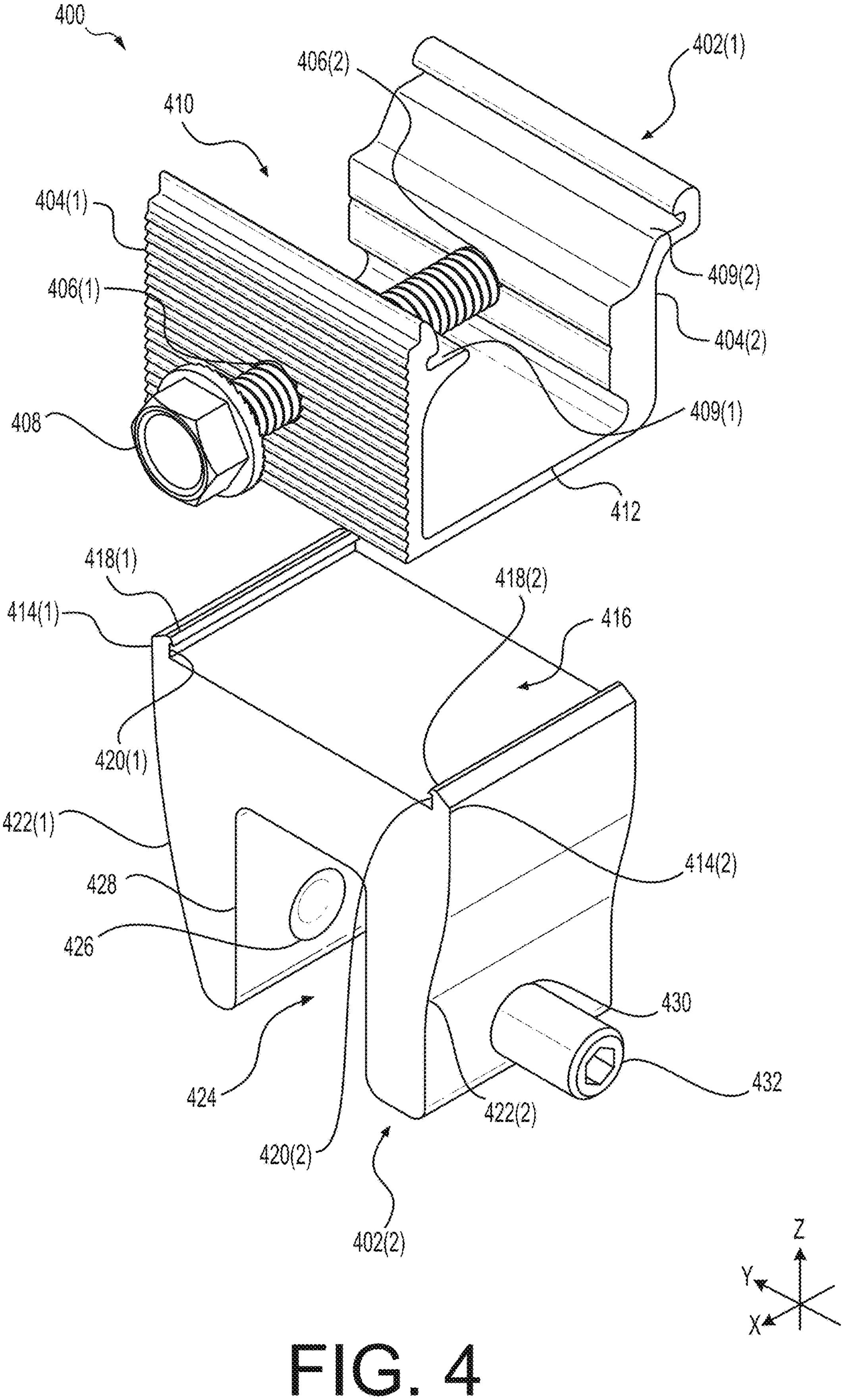
FIG. 4 illustrates an exploded isometric view of another embodiment of an attachment for connecting a rail for supporting solar modules to a metal roof, such as a standing seam metal roof, according to an embodiment in this disclosure.

FIG. 4 illustrates a partially exploded isometric view of another embodiment of an attachment 400 for connecting a rail to a metal roof, such as a standing seam metal roof, according to an embodiment in this disclosure.

In an embodiment, the attachment 400 may include a first component 402(1) and a second component 402(2). The first component 402(1) may correspond to a rail clamp and the second component 402(2) may correspond to a base that is configured to receive a standing seam of a roof at the installation of the attachment 400.

In an embodiment, the first component 402(1) may be U-shaped, including a first vertical wall 404(1) and a second vertical wall 404(2), defining the sides of the U-shape. Further, in an embodiment, the first vertical wall 404(1) may include a first through-hole 406(1) and the second vertical wall 404(2) may include a second through-hole 406(2). In an embodiment, the second through-hole 406(2) may comprise a threaded aperture. A fastener 408 (e.g., bolt, set screw, etc.) may be accommodated within the first and second through-holes 406(1)/406(2) and, upon rotation thereof, may cause the first vertical wall 404(1) and the second vertical wall 404(2) to draw closer to each other (or separate, depending on the direction of rotation). In an embodiment, the outer surface of the first vertical wall 404(1) may include a series of ridges or corrugations (e.g., textural features) to provide additional grip on the head of the fastener 408 when it is tightened.

The rotation of the fastener is used to secure the first component 402(1) to a lower surface of a rail (not shown). For example, in an embodiment, the first component 402(1) may include opposing ledges 409(1) and 409(2), formed with an overhanging portion at the upper ends of the first and second vertical walls 404(1)/404(2), respectively. Upon installation, a rail having a lower surface configured with laterally extending flanges (not shown) rests on the opposing ledges 409(1) and 409(2), and upon rotation of the fastener 408 causes the overhanging portions or grooves between the ledge and the overhanging portion to clasp the flanges, thereby securing the rail. It is contemplated that other means of securing a rail via the first component 402(1) are considered.

In an embodiment, the first component 402(1) further includes a channel 410 extending between the first and second vertical walls 404(1)/404(2) in a direction along the Y-axis, as shown. The first channel 410 is open in the Z-axis direction opposite the bottom wall 412 of the first component 404(1).

In an embodiment, the second component 402(2) may be configured to attach to the first component 402(1) via mechanical or manual assembly, as discussed hereinafter. For example, the second component 402(2) may include a first protrusion 414(1) and a second protrusion 414(2). The first and second protrusions 414(1)/414(2) may be elongated (in the X-axis direction) along opposing sides of a surface 416, which defines an upper side of the second component 402(2). Additionally, the first and second protrusions 414 (1)/414(2) may extend in an upward (e.g., Z-axis) direction above the surface 416. A first lip 418(1) extends inwardly from the upper edge of the first protrusion 414(1) so as to form a first inner groove 420(1) along the first protrusion 414(1) (in the X-axis direction) in conjunction with the surface 416. In an embodiment, the first inner groove 420(1) is sized to receive a first edge of the bottom wall 412 of the first component 402(1) such that the first lip 418(1) extends over a portion of the bottom wall 412, upon assembly. Likewise, a second lip 418(2) extends inwardly from the upper edge of the second protrusion 414(2) so as to form a second inner groove 420(2) along the second protrusion 414(2) (in the X-direction) in conjunction with the surface 416. In an embodiment, the second inner groove 420(2) is sized to receive a second edge of the bottom wall 412 (opposite the first edge) of the first component 402(1) such that the second lip 418(2) extends over a portion of the bottom wall 412, upon assembly.

Thus, upon mechanical or manual assembly, in which the bottom wall 412 of the first component 402(1) is placed against the surface 416, the first and second components 402(1)/402(2) may be fixed (e.g., snapped, compression fit, etc.), without requiring an additional fastener, in place to each other in all dimensions. That is, upon assembly, the first lip 418(1) of the first protrusion 414(1) and the second lip 418(2) of the second protrusion 414(2) clasp onto the bottom wall 412 in between the first and second vertical walls 404(1)/404(2). In this manner, the first component 402(1) may be fixed in place along both the Z-axis and the X-axis by the abutment of the overhanging of the first lip 418(1) and the second lip 418(2) against the top side of the bottom wall 412 and at the edges of the ends of the first and second protrusions 414(1)/414(2). Thus, upon assembly, the first component 402(1) is fixed along the X-axis, Y-axis, and Z-axis. As indicated above, unlike conventional block-style standing seam metal roof attachments, the second component 402(2) does not require additional fastener(s) to attach to another member (i.e., the first component 402(1)) that supports the rail.

The second component 402(2) further includes a first wall 422(1) and a second wall 422(2), each of which extend away from surface 416 in a direction opposite the first and second protrusions 414(1)/414(2). As such, the first and second walls 422(1)/422(2) together define the sides of a channel 424. With the first wall 422(1) and the second wall 422(2) opposing each other, the second channel 424 is configured to straddle a standing seam of a metal roof.

The channel 424 is open in the Z-axis direction at the lower side of the second component 402(2) and is closed in the Z-axis direction at the upper side by the material forming the surface 416. The direction of extension of the second channel 424 may be aligned (e.g., along the X-axis within the body) with the direction of extension of the first and second through-holes 406(1)/406(2).

In an embodiment, the first wall 422(1) may further include an indentation 426 (e.g., one or more distinct dimples, a continuous groove, etc.) on an inner surface 428 of the first wall 422(1). In another embodiment, the first wall 422(1) may not include indentation 426, such that the inner surface 428 may be smooth. The second wall 422(2) may include an aperture 430 (threaded or unthreaded) extending through the second wall 422(2) in a direction perpendicular to the inner surface 428 of the first wall 422(1). Additionally, the aperture 430 may be configured to receive a fastener 432 for securing the second component 402(2) against a standing seam of a metal roof. In an embodiment, the fastener 432 may be a set screw, bolt, or any other suitable fastener. The aperture 430 may align with the indentation 426, such that the fastener 432 may engage with, the indentation 426 to provide an improved connection between the attachment 400 to a standing seam on which the attachment 400 is installed. In an embodiment, the second component 402(2) may include multiple apertures (threaded or unthreaded) like aperture 430 to accommodate additional fasteners.

In an example, one or more of the first component 402(1) or the second component 402(2) of the attachment 400 may be formed via extrusion, casting, or 3D-printing manufacturing methods.

Figure 5:
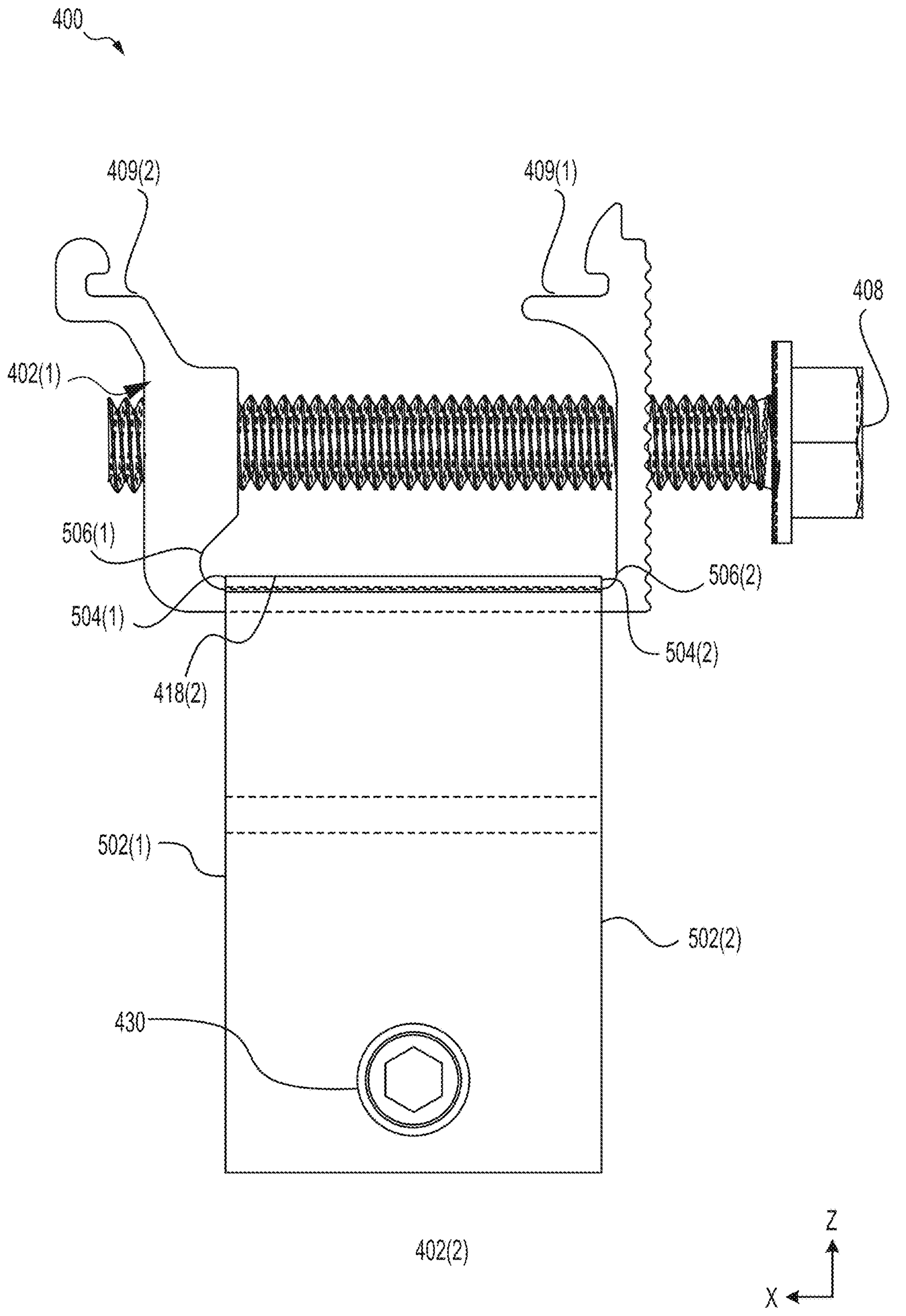
FIG. 5 illustrates a first side view of the integrated attachment of FIG. 4, according to an embodiment in this disclosure.

FIG. 5 illustrates a first side view the attachment 400, according to an embodiment in this disclosure. In an embodiment, FIG. 5 illustrates the second component 402(2) secured to the first component 402(1). As depicted, a first side 502(1) of the second component 402(2) includes a first corner 504(1). The first corner 504(1) may be proximate to a first inner groove 506(1) of the first component 402(1) such that the first corner 504(1) contacts the surface of the first inner groove 506(1) when the second component 402(2) is moved in the X-axis direction, thereby preventing the second component 402(2) from moving or detaching from the first component 402(1). Similarly, a second side 502(2) of the second component 402(2) includes a second corner 504(2). The second corner 504(2) may be proximate to a second inner groove 506(2) of the first component 402(1) that contacts the surface of the second inner groove 506(2) when the second component 402(2) is moved in the X-axis direction, thereby preventing the second component 402(2) from moving or detaching from the first component 402(1) along the Z-axis.

In an embodiment, a machine-generated force may be used to secure the first component 402(1) and the second component 402(2). As an example, a first edge of the bottom wall 412 may be inserted (mechanically or by a user) into a first inner groove 420(1) of the second component 402(2). In this example, a machine-generated force may be used to press a second edge of the bottom wall 412 over a lead-in chamfer on the top side of lips 418(1)/418(2), such that the first component 402(1) and the second component 402(2) are inseparable when moved in any of the X, Y, or Z-axis directions. In an embodiment, the second component 402(2) may be extruded such that the lips 418(1)/418(2) are slightly splayed apart, thereby allowing the first component 402(1) and the second component 402(2) to be detachable (e.g., after being secured as described herein).

Figure 6:
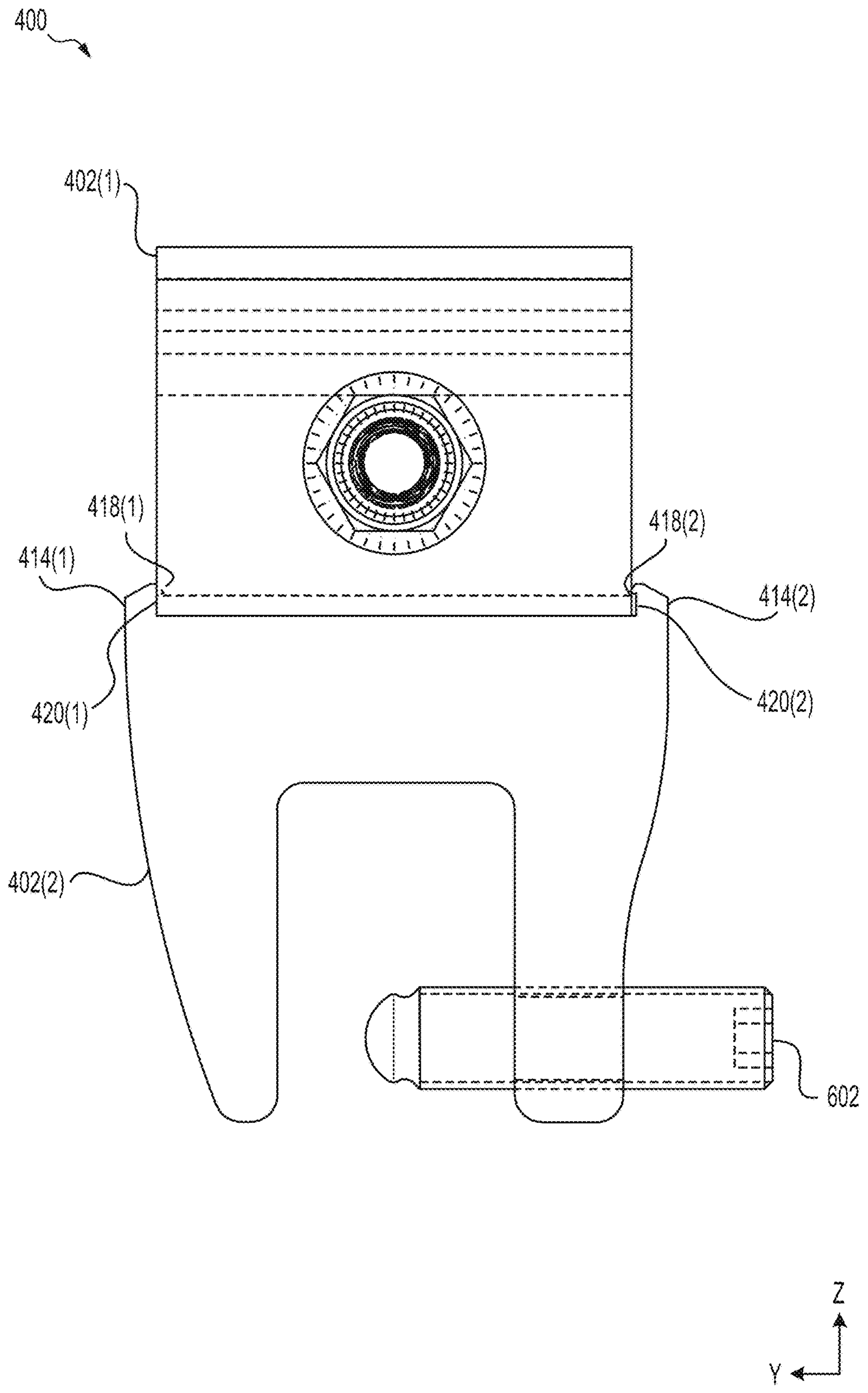
FIG. 6 illustrates a second side view of the integrated attachment of FIG. 4, according to an embodiment in this disclosure.

FIG. 6 illustrates a second side view of the attachment 400, according to an embodiment in this disclosure. In an embodiment, FIG. 6 illustrates the first component 402(1) and the second component 402(2) are secured in the X, Y, and Z-axis directions. As depicted, the first side edge of the bottom wall 412 of the first component 402(1) may be inserted into the second inner groove 420(2) of the second vertical wall 416(2) of the second component 402(2). The second lip 418(2) may extend over the edge of the bottom wall 412, such that the first component 402(1) is fixedly attached and unable to move. Additionally, a fastener 602 (e.g., a set screw, a screw, a bolt, or any other suitable fastener) may be the aperture 430 to secure the second component 402(2) to a standing seam during installation.

Figure 7:
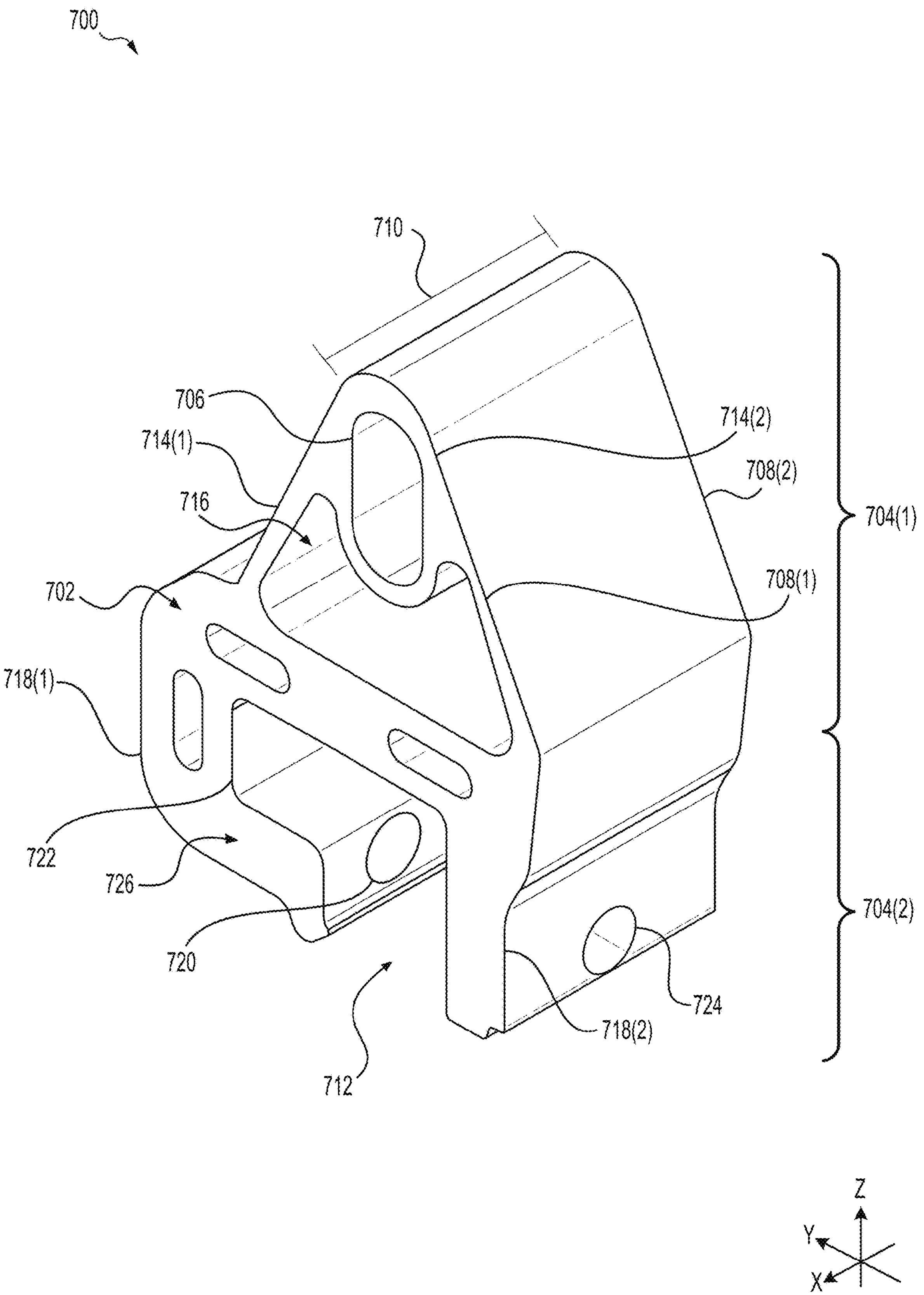
FIG. 7 illustrates an isometric view of another embodiment of an integrated attachment for connecting a rail for supporting solar modules to a metal roof, such as a standing seam metal roof, according to an embodiment in this disclosure.

FIG. 7 illustrates an isometric view of another example of an integrated attachment 700 for connecting a rail for supporting solar modules to a metal roof, such as a standing seam metal roof, according to an embodiment in this disclosure. The integrated attachment 700 may be configured to connect to a rail and a standing seam, corrugation, or other protrusion in the metal roof.

The integrated attachment 700 may include a body 702 that may be extruded as a single piece. For example, the integrated attachment 700 may be a metal extrusion, such as an aluminum extrusion, although other suitable materials or methods of manufacture may be considered according to desired performance and function.

The body 702 may include a top portion 704(1) and a bottom portion 704(2). The top portion 704(1) may include a through-hole 706 defined along an X-axis through the body 702 from a first side 708(1) to a second side 708(2). A thickness 710 of the body 702, measured in the X-axis direction from the first side 708(1) to the second side 708(2), may vary (the dimensions are determined prior to manufacture) depending on the desired structural integrity of the body 702 under expected loads after installation. In an embodiment, a shape of a cross-sectional (taken along a Y-Z plane) opening of the through-hole 706 may be elongated, along the Z-direction, as shown. Further, the through-hole 706 may vary in size and/or shape, so long as the size/shape accommodates a fastener (not shown) therein to secure the top portion 704(1) of the body 702 to a rail. Accordingly, the fastener may be moveable or adjustable within the through-hole 706 along the Z-axis to enable the integrated attachment 700 to be positioned at various relative positions to the rail.

The bottom portion 704(2) may include a channel 712 that extends in the direction of the thickness 710 as well. The channel 712 is open in the Z-axis direction at the edge of the bottom portion 704(2) and is closed in the Z-axis direction by a web of material of the body 702 distinguishing the bottom portion 704(2) from the top portion 704(1). As such, the channel 712 does not intersect the through-hole 706. The direction of extension of the channel 712 may be aligned (e.g., along the X-axis within the body 702) with the direction of extension of the through-hole 706. In the embodiment of FIG. 7, the through-hole 706 has a width (e.g., measured in the Y-direction) that is less than a width of the channel 712 (e.g., measured in the Y-direction), but the relative widths of the through-hole 706 and the channel 712 may be different in other embodiments. Notably, the channel has a non-linear shape. Compared to the channels 112 and 424, channel 712 extends in the Z-direction at the opening, and bends in the Y-direction thereafter. Different shaped embodiments may accommodate different known profiles of standing seams. In an embodiment, the first vertical wall 718(1) may further include a horizontal arm portion 726, that slidably engages with a surface of the standing seam as the channel 712 straddles the standing seam.

The top portion 704(1) may further include a first sidewall 714(1) and a second sidewall 714(2) configured to form a triangular shape and enclose therebetween the through-hole 706. Additionally, the top portion 704(1) may include a cavity 716 to further reduce the material bulk. The cavity 716 may extend in the X-axis direction from the first side 708(1) of the body 702 to the second side 708(2) of the body 702. Though shown as completely through the thickness 710 of the body 702, the cavity 716 may vary in size, depth, and shape, and may be disposed between the through-hole 706 and the channel 712. In an embodiment, the cavity 716 may assist in wire management. As an example, a clip or other attachment (not shown) may be inserted into the cavity 716 or attached to a sidewall (e.g., first or second sidewalls 714(1)/714(2)) of the body 702 and an inner wall of the cavity 716. The use of the clip with the cavity 716 may prevent interference with a module, module clamps and roof attachments.

The bottom portion 704(2) may further include a first vertical wall 718(1) and a second vertical wall 718(2), which together define the sides of the channel 712. With the first vertical wall 718(1) and the second vertical wall 718(2) opposing each other, the channel 712 is configured to straddle a standing seam of a metal roof. The first vertical wall 718(1) may include an indentation 720 (e.g., one or more distinct dimples, a continuous groove, etc.) on an inner surface 722. In another embodiment, the first vertical wall 718(1) may not include indentation 720, such that the inner surface 722 may be smooth. The second vertical wall 718(2) may include an aperture 724 that extends through the second vertical wall 718(2) and in a direction perpendicular to the channel 712. In an embodiment, the aperture 724 may be threaded and/or otherwise configured to receive a fastener for securing the bottom portion 704(2) of the body 702 against a standing seam of a metal roof. In an embodiment, the fastener may be a set screw, screw, bolt, or any other suitable type of fastener. The aperture 724 may be concentric to, or otherwise aligned to engage with, the indentation 720 to provide an improved connection between the integrated attachment 700 and a standing seam on which the integrated attachment 700 is installed. In an alternative embodiment, the bottom portion 704(2) may include multiple apertures, like aperture 724.

Figure 8:
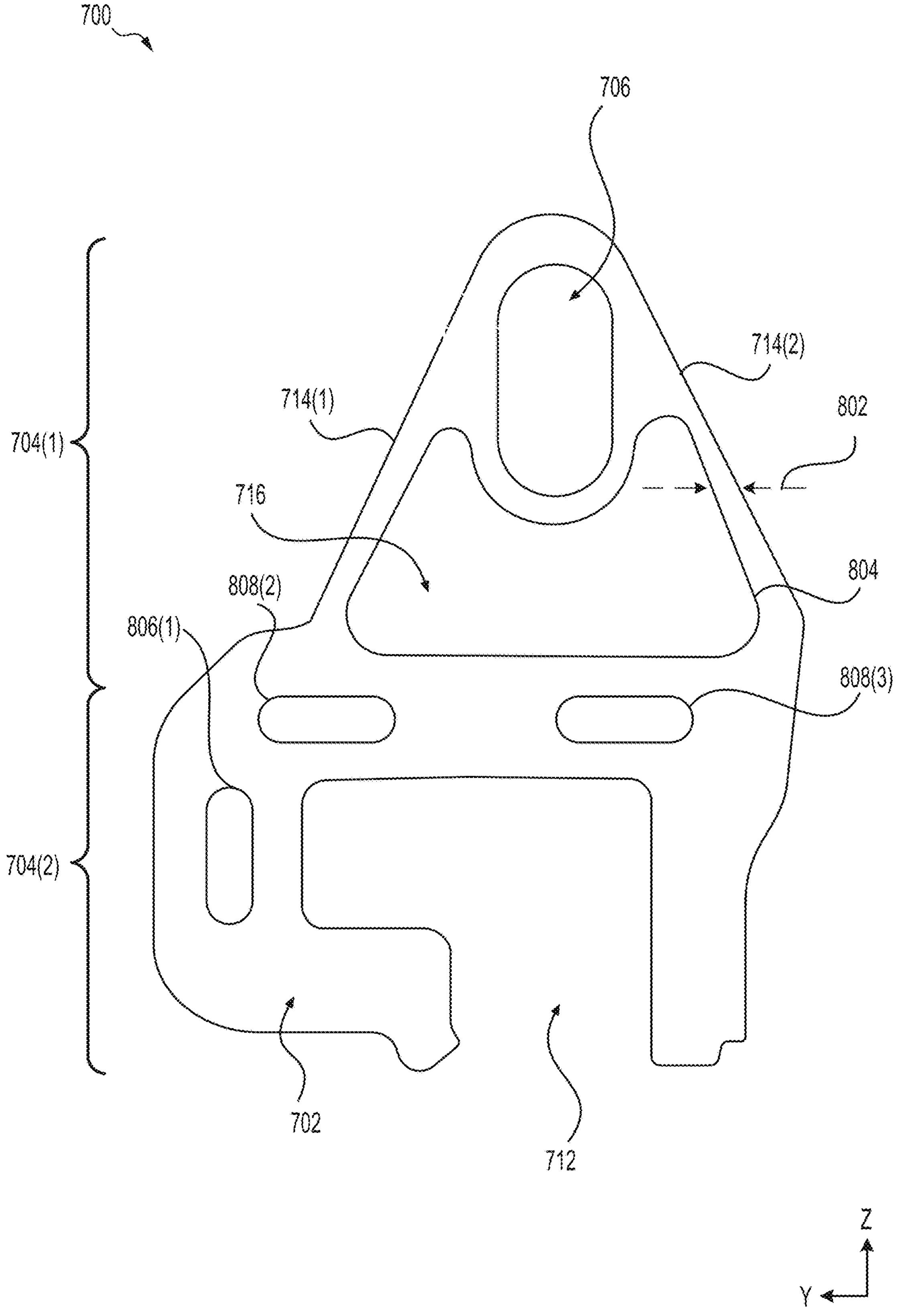
FIG. 8 illustrates a side view of the integrated attachment of FIG. 7, according to an embodiment in this disclosure.

FIG. 8 illustrates a first side view of the integrated attachment 700, according to an embodiment in this disclosure. As depicted, the top portion 704(1) of the body 702 may include the first sidewall 714(1) and the second sidewall 714(2). In an embodiment, the top portion 704(1) may be configured to enable attachment to a solar support rail either by T-bolt (or any other suitable fastener) or by a rail clamp.

As noted above, the top portion 704(1) may be formed in a triangular shape. With respect to the sidewall 714(2) (for example) between and the inner wall 804 of the cavity 716, a wall thickness 802 may vary. As noted above, the size of the cavity 716 is considered with the amount of material in the integrated attachment 700. By having thinner walls 714(1)/714(2) and a larger cavity 716, less material is used, thereby saving costs associated with manufacturing. In some embodiments, wall thickness 802 may be dependent upon expected loads, but wall thickness 802 may be any suitable thickness without departing from the spirit and scope of the present disclosure.

In an embodiment, as depicted, the body 702 of the integrated attachment 700 may include additional cavities (e.g., first cavity 806(1), second cavity 806(2), third cavity 806(3)), which may further reduce the material bulk and reduce costs. While a first cavity 806(1), a second cavity 806(2), and a third cavity 806(3) are depicted, it is understood that additional cavities or fewer cavities may be present on either the top portion 802(1) or the bottom portion 802(2) of the body 702. The cavities (e.g., first cavity 806(1), second cavity 806(2), third cavity 806(3)), may vary in size and shape. In an embodiment, the cavities may be configured to receive fasteners for use in securing the integrated attachment 700 to a standing seam during installation. 806

Figure 9:
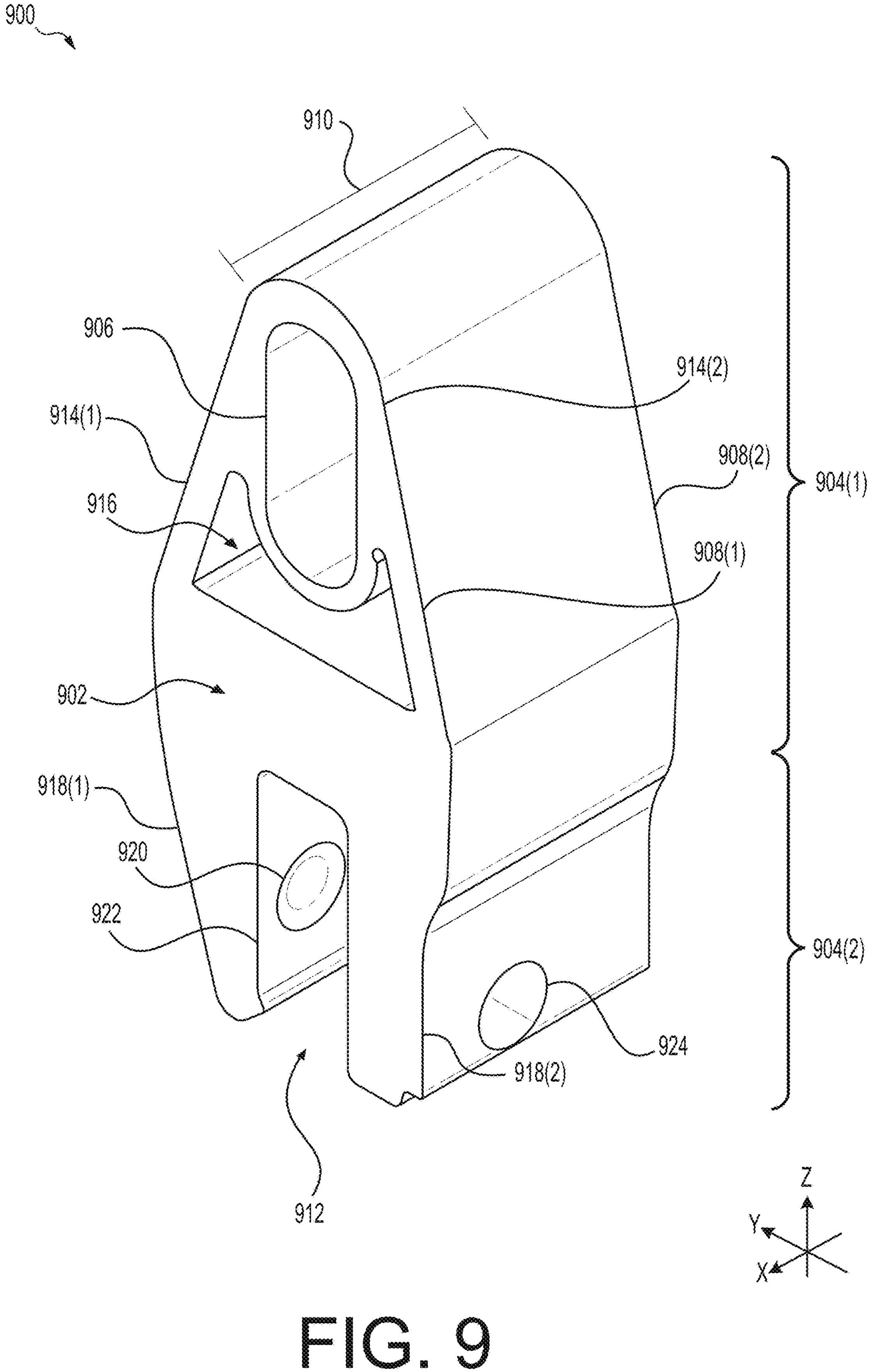
FIG. 9 illustrates an isometric view of another embodiment of an integrated attachment for connecting a rail for supporting solar modules to a metal roof, such as a standing seam metal roof, according to an embodiment in this disclosure.

FIG. 9 illustrates an isometric view of another embodiment of an integrated attachment 900 for connecting a rail for supporting solar modules to a metal roof, such as a standing seam metal roof, according to an embodiment in this disclosure.

The integrated attachment 900 may include a body 902 that may be extruded as a single piece. For example, the integrated attachment 900 may be a metal extrusion, such as an aluminum extrusion, although other suitable materials or methods of manufacture may be considered according to desired performance and function.

The body 902 may include a top portion 904(1) and a bottom portion 904(2). The top portion 904(1) may include a through-hole 906 defined along an X-axis through the body 902 from a first side 908(1) to a second side 908(2). A thickness 910 of the body 902, measured in the X-axis direction from the first side 108(1) to the second side 108(2), may vary (the dimensions are determined prior to manufacture) depending on the desired structural integrity of the body 902 under expected loads after installation. In an embodiment, a shape of a cross-sectional (taken along a Y-Z plane) opening of the through-hole 906 may be elongated in the Z-direction, as shown. Further, the through-hole 906 may vary in size and/or shape, so long as the size/shape accommodates a fastener (not shown) therein to secure the top portion 904(1) of the body 902 to a surface of a rail. Accordingly, the fastener the fastener may be moveable or adjustable within the through-hole 906 along the Z-axis to enable the integrated attachment 900 to be positioned at various relative positions to the rail. In an embodiment, the fastener may include a T-bolt or any other suitable fastener.

The bottom portion 904(2) may include a channel 912 that extends in the direction of the thickness 910 as well. The channel 912 is open in the Z-axis direction at the edge of the bottom portion 904(2) and is closed in the Z-axis direction by a web of material of the body 902 distinguishing the bottom portion 904(2) from the top portion 904(1). As such, the channel 912 does not intersect the through-hole 906. The direction of extension of the channel 912 may be aligned (e.g., along the X-axis within the body 902) with the direction of extension of the through-hole 906. In the embodiment of FIG. 9, the through-hole 906 has a width (e.g., measured in the Y-direction) that is less than a width of the channel 912 (e.g., measured in the Y-direction), but the relative widths of the through-hole 906 and the channel 912 may be different in other embodiments.

The top portion 904(1) may further include a first sidewall 914(1) and a second sidewall 914(2) configured to form a triangular shape and enclose therebetween the through-hole 906. Additionally, the top portion 904(1) may include a cavity 916 to further reduce the material bulk. Though shown as completely through the thickness 910 of the body 902, the cavity 916 may extend along the X-axis from the first side 908(1) of the body 902 to the second side 908(2) of the body 902. The cavity 916 may vary in size, depth, and shape and may be disposed between the through-hole 906 and the channel 912. In an embodiment, the cavity 916 may assist in wire management. As an example, a clip or other attachment (not shown) may be inserted into the cavity 916 or attached to a sidewall (e.g., first or second sidewalls 914(1)/914(2)) of the body 902 and an inner wall of the cavity 916. The use of the clip with the cavity 916 may prevent interference with a module, module clamps, and roof attachments.

The bottom portion 904(2) may further include a first vertical wall 918(1) and a second vertical wall 918(2), which together define the sides of the channel 912. With the first vertical wall 918(1) and the second vertical wall 918(2) opposing each other, the channel 912 is configured to straddle a standing seam of a metal roof. The first vertical wall 918(1) may include an indentation 920 (e.g., one or more distinct dimples, a continuous groove, etc.) on an inner surface 922. In another embodiment, the first vertical wall 918(1) may not include indentation 920, such that the inner surface 922 may be smooth. The second vertical wall 918(2) may include an aperture 924 that extends through the second vertical wall 918(2) and in a direction perpendicular to the channel 912. In an embodiment, the aperture 924 may be threaded and/or otherwise configured to receive a fastener for securing the bottom portion 904(2) of the body 902 against a standing seam of a metal roof. In an embodiment, the fastener may be a set screw, screw, bolt, or any other suitable type of fastener. The aperture 924 may be concentric to, or otherwise aligned to engage with, the indentation 920 to provide an improved connection between the integrated attachment 900 to a standing seam on which the integrated attachment 900 is installed. In an alternative embodiment, the bottom portion 904(2) may include multiple apertures (threaded or unthreaded) like aperture 924. Additionally, in an embodiment, the channel 912 may be a U-shaped channel.

Figure 10:
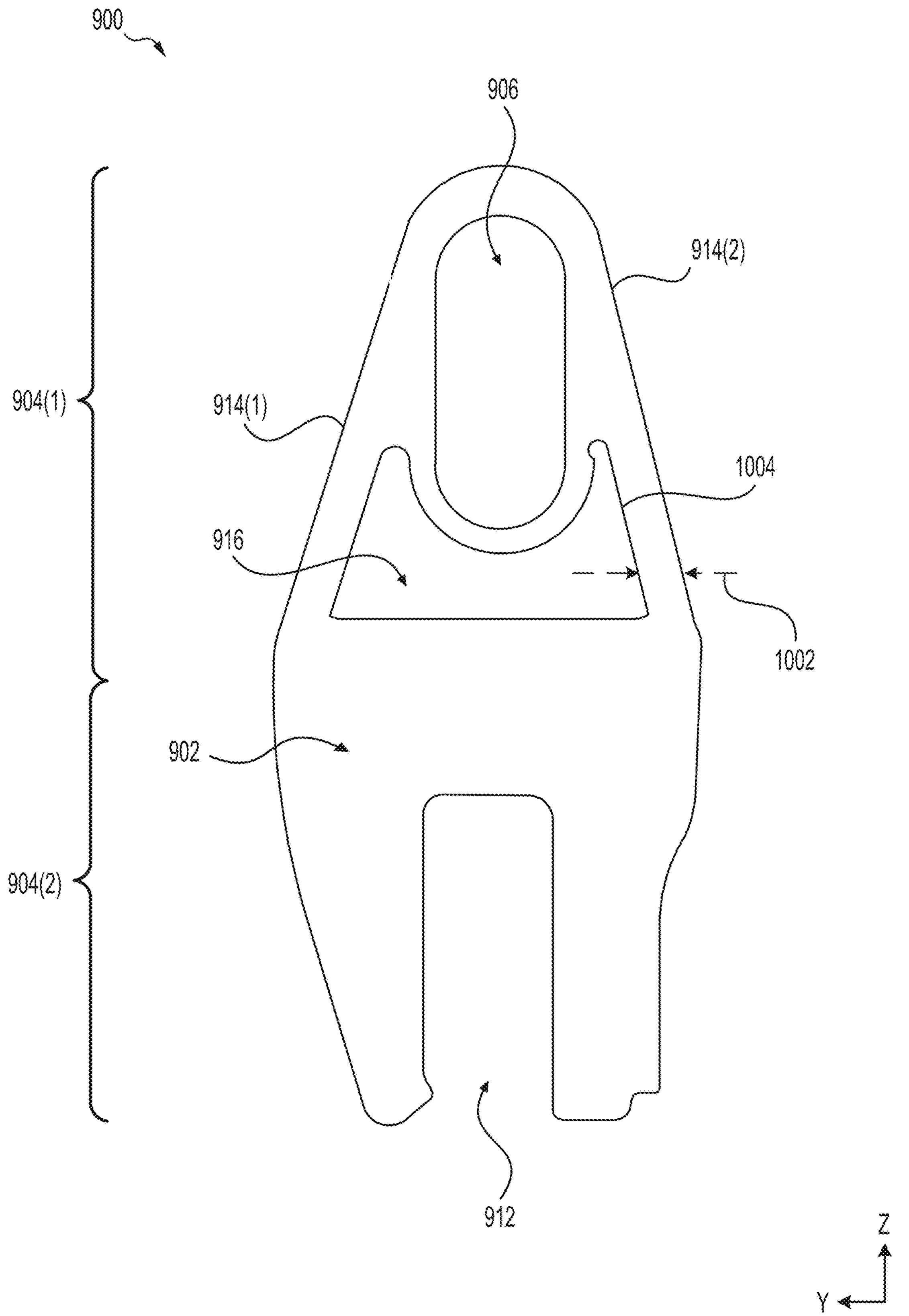
FIG. 10 illustrates a side view of the integrated attachment of FIG. 9, according to an embodiment in this disclosure.

FIG. 10 illustrates a first side view of the integrated attachment 900, according to an embodiment in this disclosure. As depicted, the top portion 904(1) of the body 902 may include the first sidewall 914(1) and the second sidewall 914(2). In an embodiment, the top portion 904(1) may be configured to enable attachment to a solar support rail either by T-bolt (or any other suitable fastener) or by a rail clamp.

As noted above, the top portion 904(1) may be formed in a triangular shape. With respect to the sidewall 914(2) (for example) between and the inner wall of the cavity 916, a wall thickness 1002 may vary. As noted above, the size of the cavity 916 is considered with the amount of material in the integrated attachment 900. By having thinner walls 914(1)/914(2) and a larger cavity 916, less material is used, thereby saving costs associated with manufacturing. Nevertheless, if the wall thickness 1002 is too thin, then the top portion 904(1) will be weaker. As such, the wall thickness 1002 may be determined based on expected loads.

Figure 11:
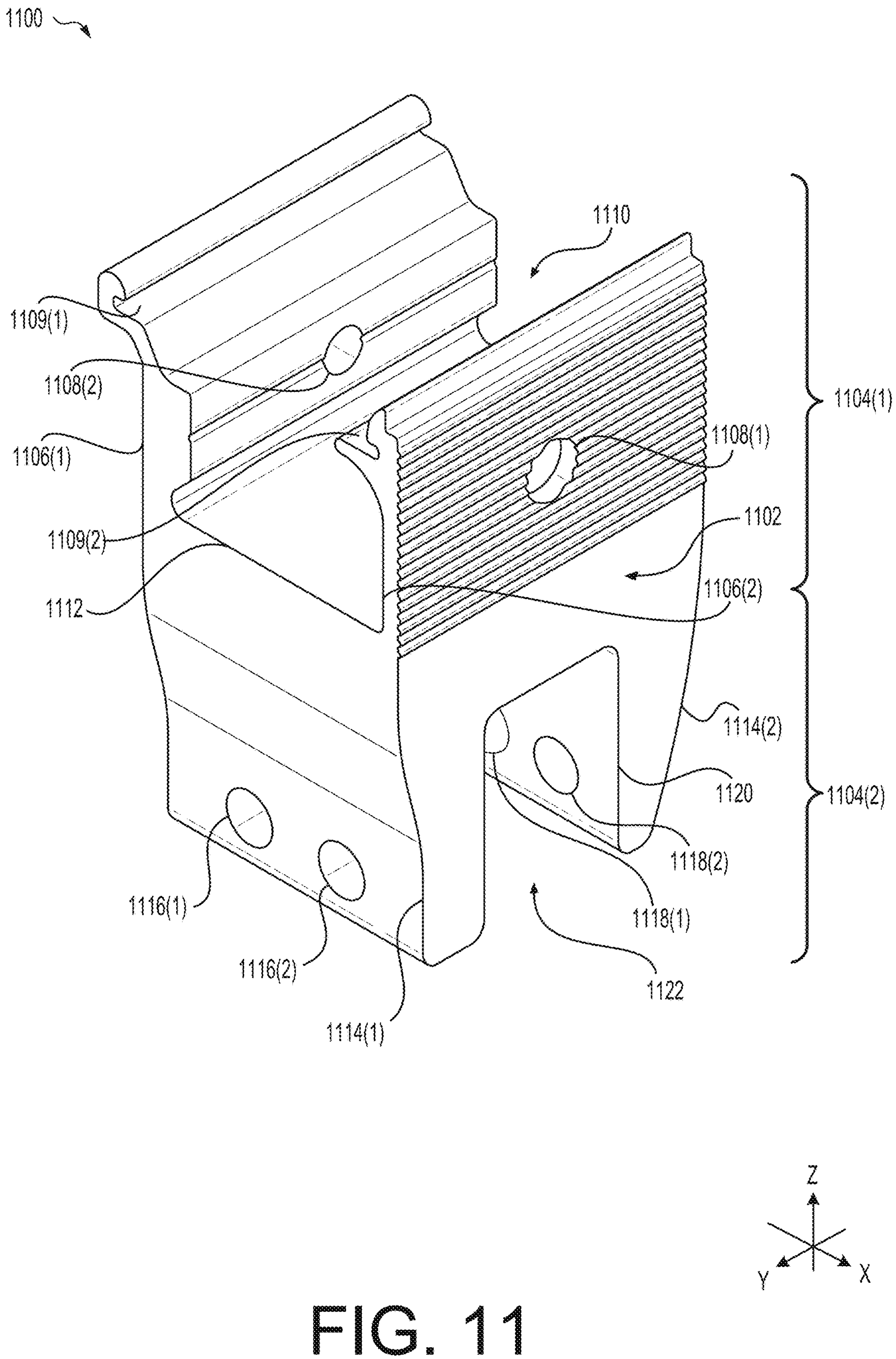
FIG. 11 illustrates an isometric view of another embodiment of an integrated attachment for connecting a rail for supporting solar modules to a metal roof, such as a standing seam metal roof, according to an embodiment in this disclosure.

FIG. 11 illustrates an isometric view of another example of an integrated attachment 1100 for connecting a rail, for supporting solar modules, to a metal roof, such as a standing seam metal roof, according to an embodiment in this disclosure.

The integrated attachment 1100 may include a body 1102 that may be formed according to any suitable method and made of any suitable material. The function of the embodiment of FIG. 11 is similar to that of the embodiment in FIGS. 4-6. However, instead of being formed of two independent parts, the attachment 1100 is formed in a unitary body.

For instance, the integrated attachment 1100 may be cast. In another embodiment, the integrated attachment 1100 may be formed as an extrusion. For instance, the integrated attachment 1100 may be extruded in the Y-axis direction to produce the cross-section of the top portion 1104(1) (including channel 1110), where the bottom portion 1104(2) is extruded as a solid block. The features illustrated herein of the bottom portion 1104(2) (e.g., such as channel 1122, etc.) may be machined via a milling, broaching operation, or any other suitable method.

The body 1102 of the integrated attachment 1100 may include a top portion 1104(1) and a bottom portion 1104(2). The top portion 1104(1) may correspond to a rail clamp and the bottom portion 1104(2) may correspond to a base that is configured to receive a standing seam of a roof at the installation of the integrated attachment 1100.

In an embodiment, the top portion 1104(1) may be U-shaped, including a first vertical wall 1106(1) and a second vertical wall 1106(2), defining the sides of the U-shape. Further, in an embodiment, the first vertical wall 1106(1) may include a first through-hole 1108(1) and the second vertical wall 1106(2) may include a second through-hole 1108(2). In an embodiment, the second through-hole 1106(2) may comprise a threaded aperture. A fastener (not shown) (e.g., bolt, set screw, etc.) may be accommodated within the first and second through-holes 1108(1)/1108(2) and, upon rotation thereof, may cause the first vertical wall 1106(1) and the second vertical wall 1106(2) to draw closer to each other (or separate, depending on the direction of rotation). In an embodiment, the outer surface of the first vertical wall 1106(1) may include a series of ridges or corrugations (e.g., textural features) to provide additional grip on the head of the fastener when it is tightened.

The rotation of the fastener is used to secure the top portion 1104(1) to a lower surface of a rail (not shown). For example, in an embodiment, the top portion 1104(1) may include opposing ledges 1109(1) and 1109(2), formed with an overhanging portion at the upper ends of the first and second vertical walls 1106(1)/1106(2), respectively. Upon installation, a rail having a lower surface configured with laterally extending flanges (not shown) rests on the opposing ledges 1109(1) and 1109(2), and upon rotation of the fastener causes the overhanging portions or grooves between the ledge and the overhanging portion to clasp the flanges, thereby securing the rail. It is contemplated that other means of securing a rail via the top portion 1104(1) are considered.

In an embodiment, the top portion 1104(1) further includes a first channel 1110 extending between the first and second vertical walls 1106(1)/1106(2) in a direction along the Y-axis, as shown. The first channel 1110 is open in the Z-axis direction opposite the bottom wall 1112 of the top portion 1104(1).

The bottom portion 1104(2) of the body 1102 may include a first wall 1114(1) and a second wall 1114(2), each of which extend in a direction (along the Z-axis) opposite the first and second vertical walls 1106(1)/1106(2). As such, the first and second walls 1114(1)/1112(2) together define the sides of a second channel 1122. With the first wall 1114(1) and the second wall 1114(2) opposing each other, the second channel 112 is configured to straddle a standing seam of a metal roof.

The channel 1122 is open in the Z-axis direction at the lower side of the bottom portion 1104(2) and is closed in the Z-axis direction by a web of material of the body 1102 distinguishing the bottom portion 1104(2) from the top portion 1104(1). As such, the second channel 1122 does not intersect the first or second through-hole 1108(1)/1108(2), nor does the second channel 1122 intersect the first or second walls 1106(1)/1106(2) above. The direction of extension of the second channel 1122 may be aligned (e.g., along the X-axis within the body 1102) with the direction of extension of the first and second through-hole 1108(1)/1108(2). In other words, the second channel 1122 extends between the first and second vertical walls 1114(1)/1112(2) in a direction along the X-axis, as shown. In an embodiment, the second channel 1122 may be a U-shaped channel.

In an embodiment, the first wall 1114(1) may further include one or more aperture(s) (threaded or unthreaded), such as a first aperture 1116(1) and a second aperture 1116(2) that extend through the first wall 1114(1) and in a direction perpendicular to the second channel 1122. The first aperture 1116(1) and the second aperture 1116(2) may be configured to receive one or more fasteners, respectively, for securing the bottom portion 1104(2) of the body 1102 against a standing seam of a metal roof. In an embodiment, the one or more fasteners may be set screw(s), screw(s), bolt(s), or any other suitable fastener. In an alternative embodiment, the body 1102 may include a single aperture (threaded or unthreaded) like first and second apertures 1116(1)/1116(2).

The second wall 1114(2) may further include one or more indentations (e.g., a first indentation 1118(1) and a second indentation 1118(2)) on a surface 1120 of the second wall 1114(2). In another embodiment, the second wall 1114(2) may not include the indentations, such that the surface 1120 may be smooth. The first aperture 1116(1) and the second aperture 1116(2) may align with the first indentation 1118(1) and the second indentation 1118(2), such that the one or more fasteners may engage with the first and second indentations 1118(1)/1118(2) to provide an improved connection between the integrated attachment 1100 to a standing seam on which the integrated attachment 1100 is installed.

Figure 12:
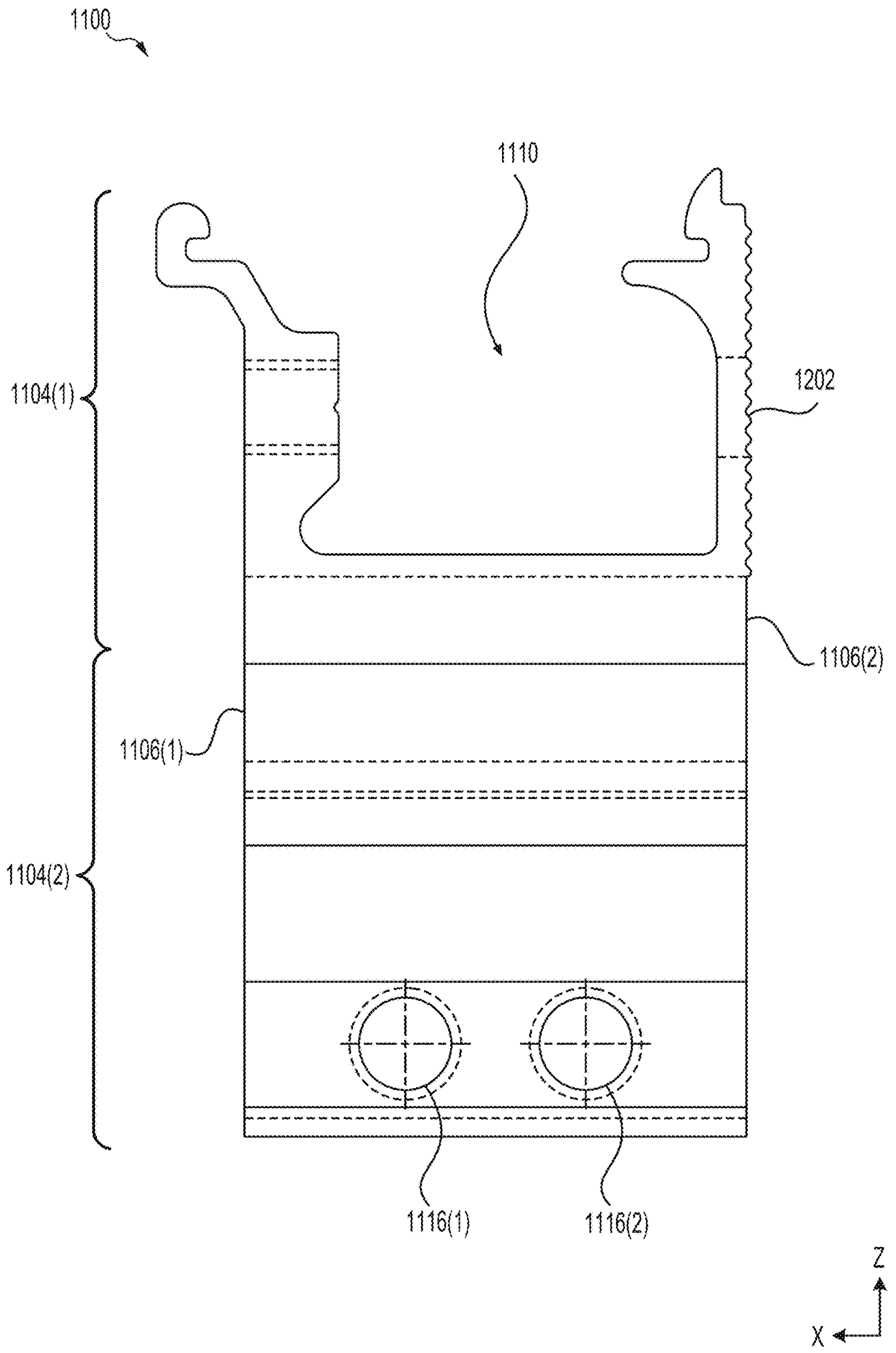
FIG. 12 illustrates a first side view of the integrated attachment of FIG. 11, according to another embodiment in this disclosure.

FIG. 12 illustrates a first side view of the integrated attachment 1100 of FIG. 11, according to another embodiment in this disclosure. As depicted, the integrated attachment 1100 includes the top portion 1104(1) and the bottom portion 1104(2). The second vertical wall 1106(2) of the top portion 1104(1) may include a ridged surface 1202 that includes a series of ridges or corrugations (e.g., textural features) to provide additional grip on the head of a fastener when it is tightened configured to provide improved attachment between the integrated attachment 1100 and a rail during installation.

Figure 13:
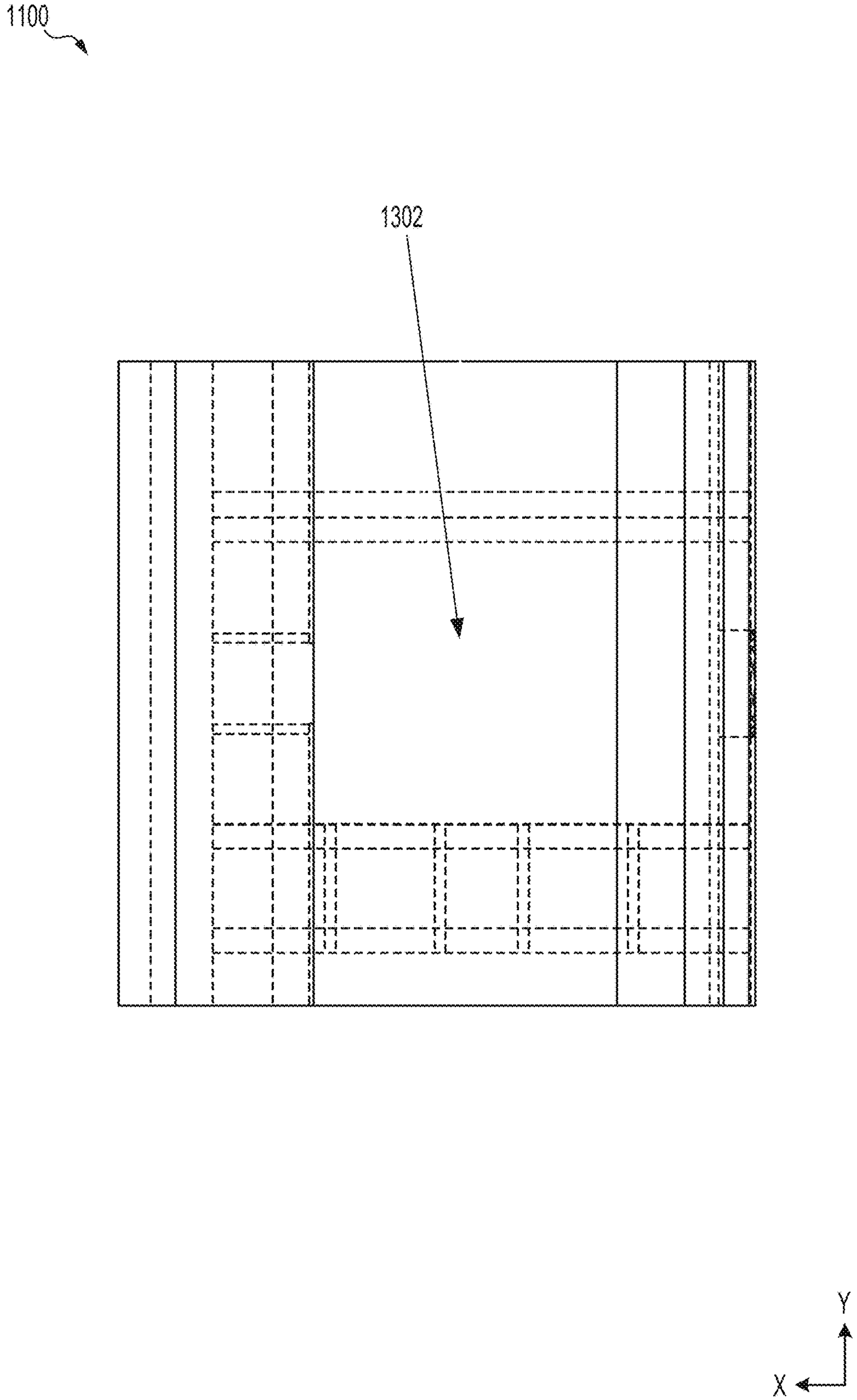
FIG. 13 illustrates a second side view of the integrated attachment of FIG. 11, according to an embodiment in this disclosure.

FIG. 13 illustrates a second side view of the integrated attachment 1100 of FIG. 11, according to an embodiment in this disclosure. In particular, FIG. 13 depicts a surface 1302 that defines an area between the first and second vertical walls 1106(1)/1106(2) of the top portion 1104(1). Unlike conventional block-style standing seam metal roof attachments, the surface 1302 does not include a through-hole. As such the integrated attachment 1100 does not require additional fastener(s) to attach to another member that supports the rail.

Figure 14:
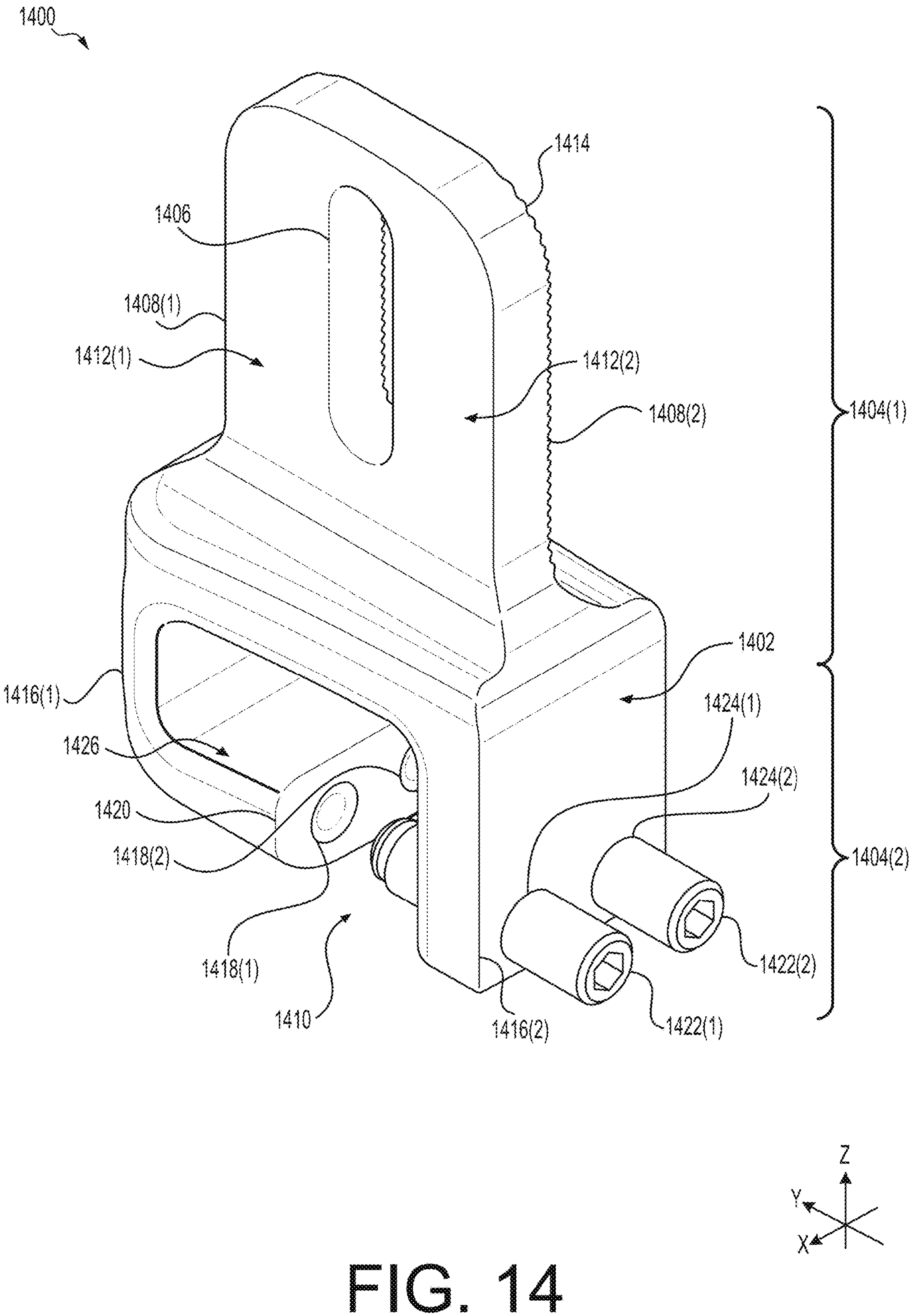
FIG. 14 illustrates an isometric view of another embodiment of an integrated attachment for connecting a rail for supporting solar modules to a metal roof, such as a standing seam metal roof, according to an embodiment in this disclosure.

FIG. 14 illustrates an isometric view of another example of an integrated attachment 1400 for connecting a rail for supporting solar modules to a metal roof, such as a standing seam metal roof, according to an embodiment in this disclosure. In an embodiment, the integrated attachment 1400 may be cast. In another embodiment, the integrated attachment 1400 may be formed as an extrusion. For instance, the integrated attachment 1400 may be extruded in the Y-axis direction to produce the top portion 1404(1) (including through-hole 1406), where the bottom portion 1104(2) is extruded as including channel 1410. One or more features illustrated herein of the body 1402 may be machined via a milling, broaching operation, or any other suitable method.

The integrated attachment 1400 may be configured to connect to a rail and a standing seam, corrugation, or other protrusion in the metal roof. In an embodiment, the integrated attachment 1400 may include a body 1402 that may be extruded or cast as a single piece, of any suitable material, (which may affect the specific shape such as the rounded corners).

The body 1402 may include a top portion 1404(1) and a bottom portion 1404(2). The top portion 1404(1) may include a through-hole 1406 defined along an X-axis through the body 1402 from a first side 1408(1) to a second side 1408(2). A thickness of the body 1402, measured in the X-axis direction from the first side 1408(1) to the second side 1408(2), may vary (the dimensions are determined prior to manufacture) depending on the desired structural integrity of the body 1402 under expected loads after installation. In an embodiment, a shape of a cross-sectional (taken along a Y-Z plane) opening of the through-hole 1406 may be elongated in the Z-direction, as shown. Further, the through-hole 1406 may vary in size and/or shape, so long as the size/shape accommodates a fastener (not shown) therein to secure the top portion 1404(1) of the body 1402 to a surface of a rail. Accordingly, the fastener may be moveable or adjustable within the through-hole 1406 along the Z-axis to enable the integrated attachment 1400 to be positioned at various relative positions to the rail. In an embodiment, the fastener may include a T-bolt or any other suitable fastener.

While the top portion 1404(1) is illustrated as being centered over the bottom portion 1404(2) in the X-axis direction, other embodiments are considered. For instance, in an embodiment, the top portion 1404(1) may be shifted in the X-axis direction, such that the first side 1408(1) of the top portion 1404(1) is co-planar with an outer surface of the lower portion 1404(2) (in the X-axis direction). Thus, a fastener may have an improved ability to be moved or adjusted within the through-hole 1406 (along the Z-axis) such that the fastener is prevented from coming into contact with the lower portion 1404(2).

The bottom portion 1404(2) may include a channel 1410 that extends in the direction of the thickness (e.g., along the X-axis direction) as well. The channel 1410 is open in the Z-axis direction at the edge of the bottom portion 1404(2) and is closed in the Z-axis direction by a web of material of the body 1402 distinguishing the bottom portion 1404(2) from the top portion 1404(1). As such, the channel 1410 does not intersect the through-hole 1406. The direction of extension of the channel 1410 may be aligned (e.g., along the X-axis within the body 1402) with the direction of extension of the through-hole 1406. In the embodiment of FIG. 14, the through-hole 1406 has a width (e.g., measured in the Y-direction) that is less than a width of the channel 1410 (e.g., measured in the Y-direction), but the relative widths of the through-hole 1406 and the channel 1410 may be different in other embodiments. Notably, the channel 1410 has a non-linear shape. Similar to channel 712 of FIG. 7, channel 1410 extends in the Z-direction at the opening, and bends in the Y-direction. Different shaped embodiments may accommodate different known profiles of standing seams.

The top portion 1404(1) may further include a first sidewall 1412(1) and a second sidewall 1412(2) configured to enclose therebetween the through-hole 1406 and connect at a point above the through-hole 1406. In an embodiment, the second side 1408(2) of the top portion 1404(1) of the body 1402 may include a ridged surface 1414 (e.g., a series of ridges or corrugations (e.g., textural features)) to provide additional grip on the head of a fastener (e.g., bolt, set screw, etc.) when it is tightened.

The bottom portion 1404(2) may further include a first vertical wall 1416(1) and a second vertical wall 1416(2), which together define the sides of the channel 1410. In an embodiment, the first vertical wall 1416(1) may further include a horizontal arm 1426, that slidably engages with a surface of the standing seam as the channel 1410 straddles the standing seam. The first vertical wall 1404(1) may include a first indentation 1418(1) and a second indentation 1418(2) on a surface 1420 of the first vertical wall 1404(1). The indentation(s) (e.g., first and second indentation 1418(1)/1418(2)) may include one or more distinct dimple(s), continuous groove(s), etc. In another embodiment, the first vertical wall 1404(1) may not include the indentations, such that the surface 1420 may be smooth. The second vertical wall 1404(2) may include a first fastener 1422(1) (e.g., set screw, bolt, or other suitable fastener) disposed through a first aperture 1424(1) (threaded or unthreaded) and a second fastener 1422(2) disposed through a second aperture 1424(2) (threaded or unthreaded). In an alternative embodiment, the bottom portion 1404(2) may include a single aperture and/or fastener.

Figure 15:
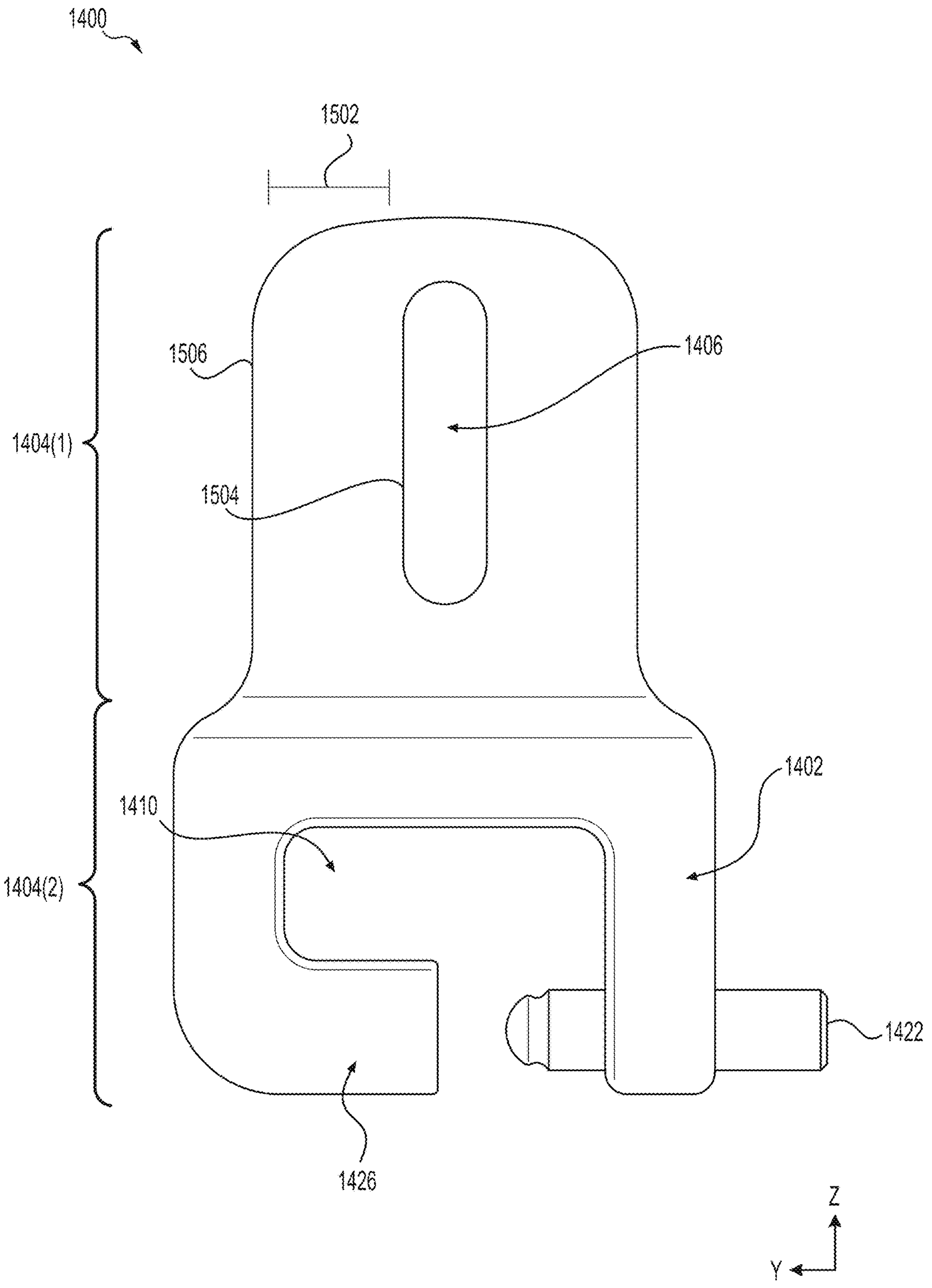
FIG. 15 illustrates a side view of the integrated attachment of FIG. 14, according to an embodiment in this disclosure.

FIG. 15 illustrates a side view of the integrated attachment 1400 of FIG. 14, according to an embodiment in this disclosure. As depicted, the top portion 1404(1) of the body 1402 may include the first sidewall 1412(1) and the second sidewall 1412(2). In an embodiment, the top portion 1404(1) may be configured to enable attachment to a solar support rail either by T-bolt (or any other suitable fastener) or by a rail clamp. With respect to the sidewall 1412(2) (for example) and the inner wall 1504 of the through-hole 1406, a wall thickness 1502 may vary.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

As used herein, terms such as "attached," "fastened," "secured," "disposed," "connected," and "coupled" (including variations thereof) are intended to be used interchangeably to refer to any form of interaction between components, whether directly or indirectly, permanently or temporarily, mechanically or otherwise. It will be understood that these terms are not intended to limit the nature of the interaction to a direct or immediate connection unless specifically stated, and may include indirect connections through one or more intermediary elements. Likewise, the terms "directly" and "indirectly" describe both physical contact between components and connections made through intermediate structures, mechanisms, or devices.

What is claimed is:

1. An apparatus comprising:

a first portion including:

a base from which extends a first side and a second side so as to form a U-shape with the base, and a through-hole extending in a first direction from the first side of the base to the second side of the base, the through-hole being configured to receive a first fastener; and a second portion couplable to the first portion, the second portion including:

a first vertical wall, a second vertical wall connected to and spaced apart from the first vertical wall, the second vertical wall having an aperture extending in a second direction perpendicular to the first direction, the aperture being configured to receive a second fastener, a channel defined between the first vertical wall and the second vertical wall, the channel being sized to receive a standing seam, a first protrusion extending above the first vertical wall, and a second protrusion extending above the second vertical wall, wherein a gap defined between the first protrusion and the second protrusion accommodates the base of the first portion to couple the first portion with the second portion.

2. The apparatus of claim 1, wherein the through-hole of the first portion is aligned vertically with the channel and the gap of the second portion.

3. The apparatus of claim 1, wherein the through-hole and the first fastener are compatibly threaded.

4. The apparatus of claim 1, wherein the first portion further includes:

a first ledge protruding inwardly from the first side of the base, and a second ledge protruding outwardly from the second side of the base.

5. The apparatus of claim 1, wherein the first vertical wall of the second portion includes a dimple on an inner surface, aligned with the aperture of the second vertical wall.

6. The apparatus of claim 1, wherein the first protrusion includes a first lip extending toward the second protrusion, and wherein the second protrusion includes a second lip extending toward the first protrusion.

7. The apparatus of claim 1, wherein the through-hole has:

a first part through the first side of the base, and a second part through the second side of the base, the second part being threaded to engage the first fastener.

8. An apparatus comprising:

a first component including:

a base from which extends a first side and a second side so as to form an upper channel therebetween, and a through-hole extending in a first direction through the first side of the base and the second side of the base; and a second component that is attachable to the first component, the second component including:

a first vertical wall, a second vertical wall connected to and spaced apart from the first vertical wall, the second vertical wall having an aperture extending in a second direction perpendicular to the first direction, a lower channel defined between the first vertical wall and the second vertical wall, the lower channel being sized to receive a standing seam, a first protrusion extending above the first vertical wall, and a second protrusion extending above the second vertical wall, wherein the base of the first component is sized to sit tightly between the first protrusion and the second protrusion.

9. The apparatus of claim 8, wherein the first protrusion and the second protrusion are shaped to hook over an upper surface of the base of the first component.

10. The apparatus of claim 8, wherein the first vertical wall includes an indentation disposed on an inner surface, the indentation being linearly aligned with a central axis through the aperture in the second vertical wall.

11. The apparatus of claim 8, wherein the first component further includes:

a first ledge protruding from the first side of the base, and a second ledge protruding from the second side of the base such that the second ledge is horizontally aligned with the first ledge.

12. The apparatus of claim 11, wherein the first component further includes:

a first groove extending along the first side at a level of the first ledge, and a second groove extending along the second side at a level of the second ledge.

13. The apparatus of claim 8, wherein a portion of the through-hole that extends through the first side of the base is a first portion, and a portion of the through-hole that extends through the second side of the base is a second portion, the second portion having a threaded internal surface so as to receive a threaded fastener therein.

14. The apparatus of claim 8, wherein the through-hole is aligned vertically with a direction of extension of the lower channel.

15. An apparatus comprising:

a first component including:

a base from which extends a first side and a second side so as to form an upper channel therebetween, and a through-hole extending in a first direction through the first side of the base and the second side of the base; and a second component that is attachable to the first component, the second component including:

a first vertical wall, a second vertical wall connected to and spaced apart from the first vertical wall, the second vertical wall having an aperture extending in a second direction perpendicular to the first direction, a lower channel defined between the first vertical wall and the second vertical wall, the lower channel being sized to receive a standing seam, a first protrusion extending above the first vertical wall and including a first lip extending toward the second protrusion, and a second protrusion extending above the second vertical wall and including a second lip extending toward the first protrusion, wherein the base of the first component is sized to sit tightly between the first protrusion and the second protrusion.

16. The apparatus of claim 15, wherein the base of the first component sits against the second component such that a bottom surface of the base engages with an upper surface of the second component that is between the first protrusion and the second protrusion.

17. The apparatus of claim 15, wherein a length of the first lip and the second lip is less than a distance between the first side of the base and the second side of the base.

18. The apparatus of claim 15, further comprising a threaded fastener sized to extend through the first side of the base and engage the through hole in the second side of the base, such that, upon rotation of the threaded fastener, the second side of the base and the first side of the base are drawn closer to each other.

19. The apparatus of claim 15, wherein the second component further includes a fastener engaged in the aperture of the second vertical wall, via which the second component is attachable to the standing seam upon installation.

20. The apparatus of claim 15, wherein the second component further includes a dimple on an inner surface of the first vertical wall, the dimple being linearly aligned with a center axis of the aperture in the second vertical wall.

* * * * *